Patented Jan. 25, 1938

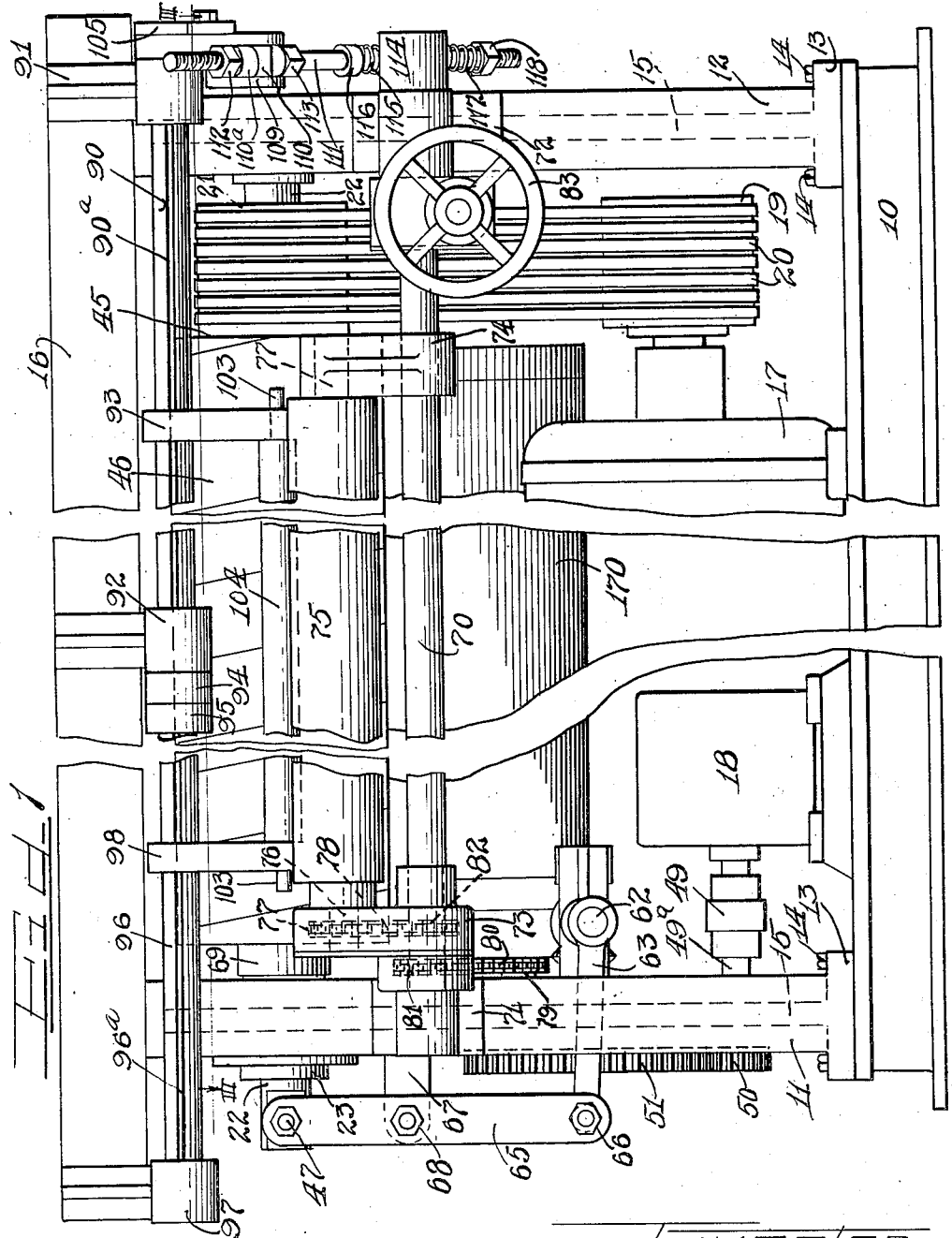

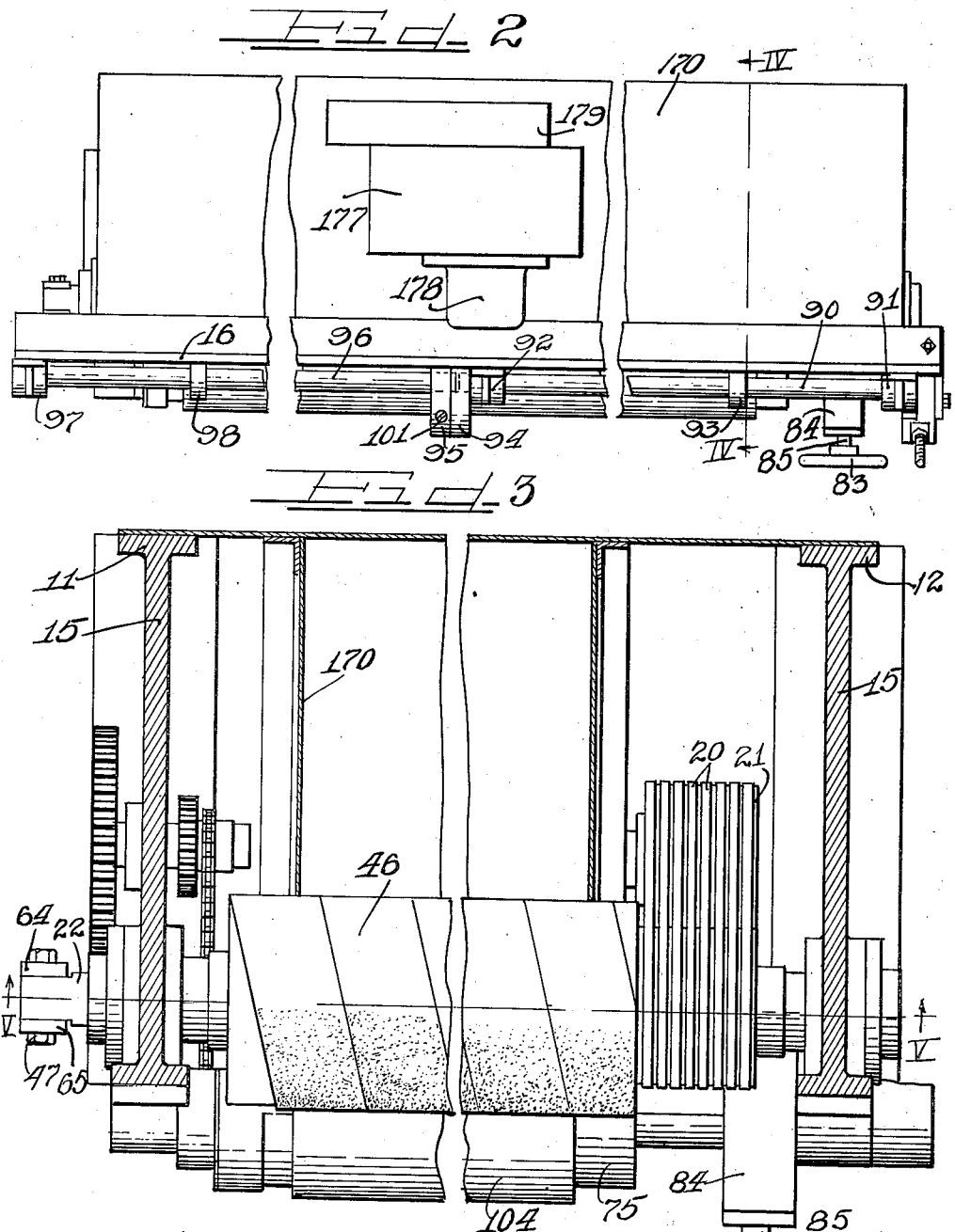

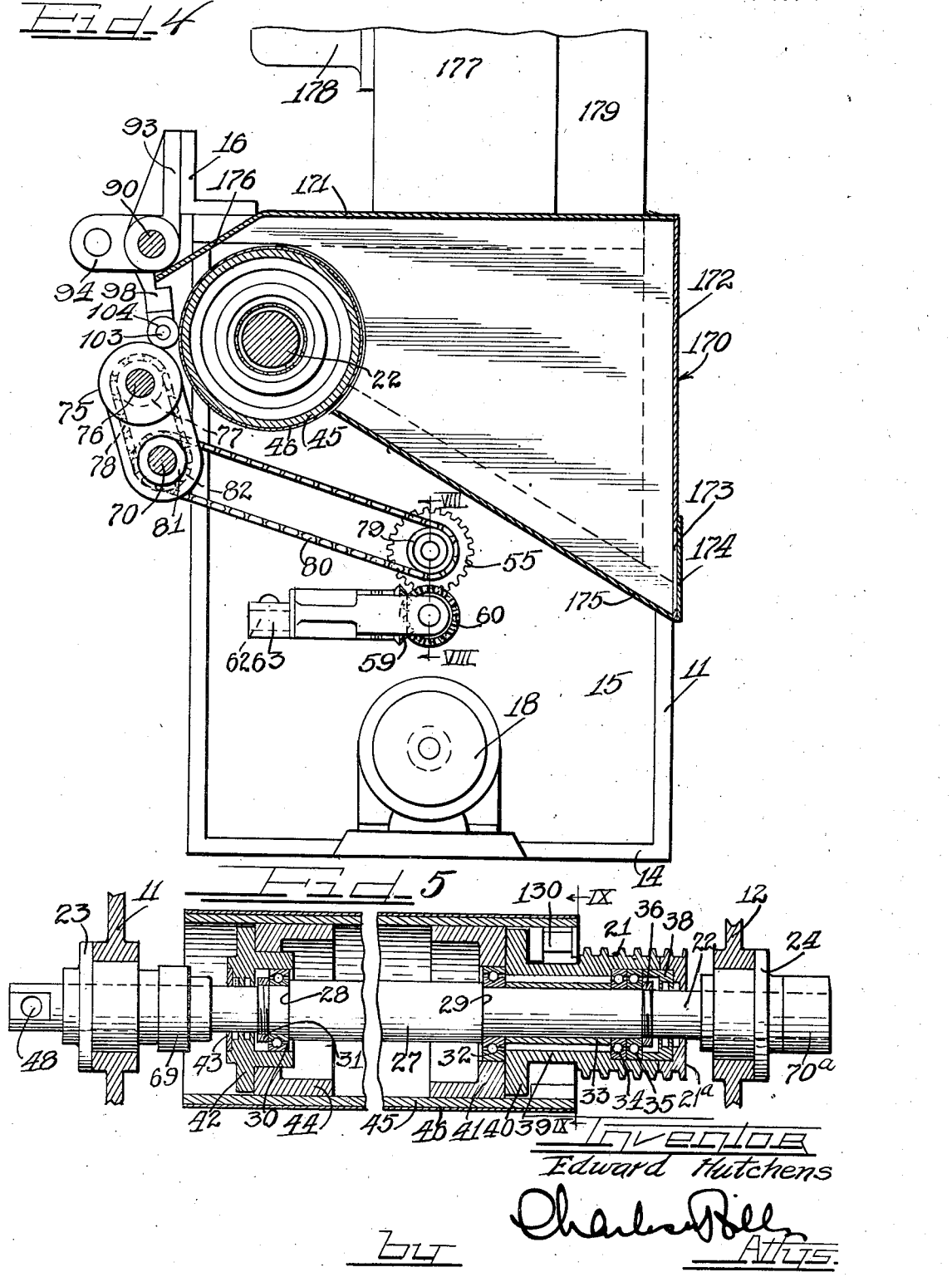

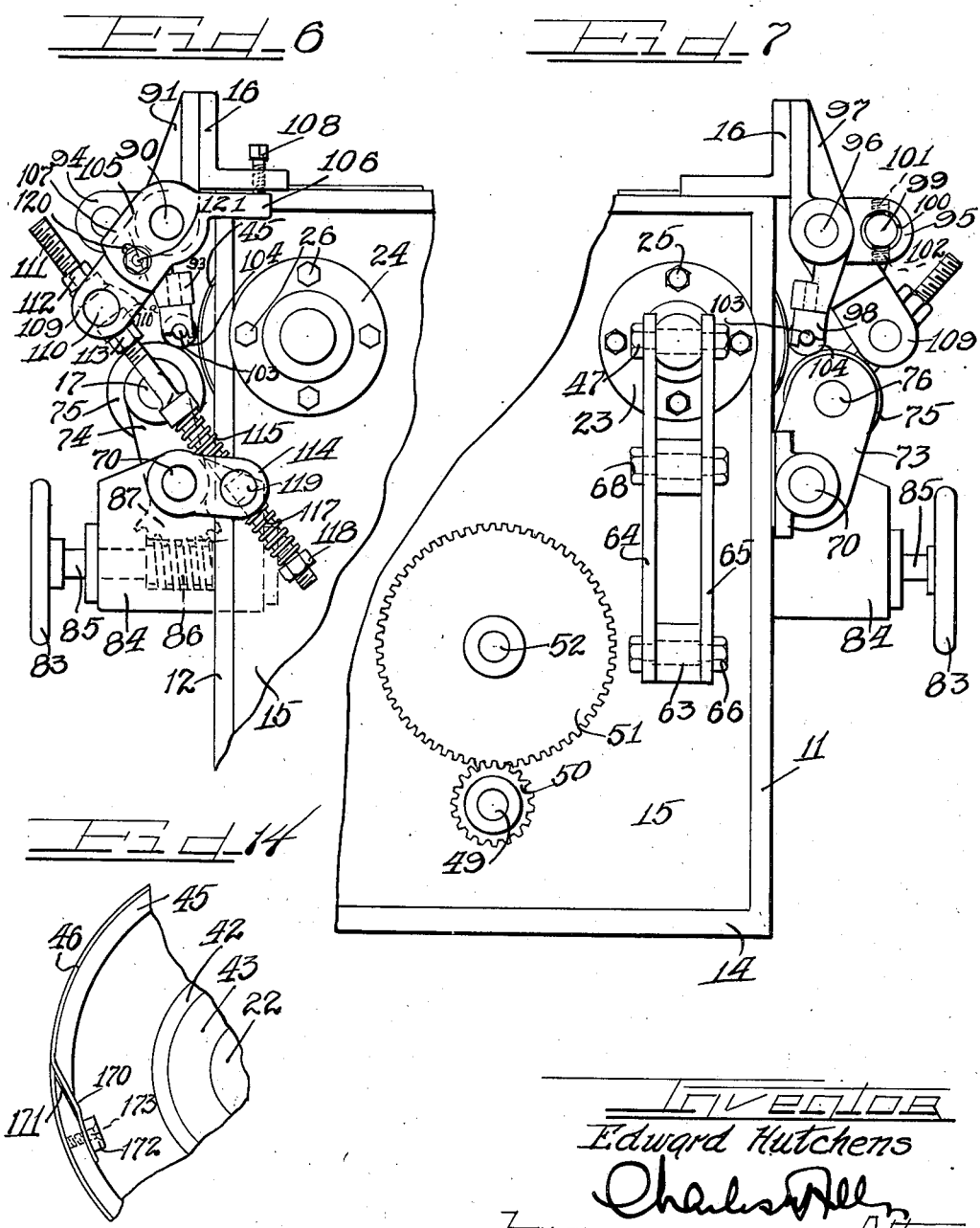

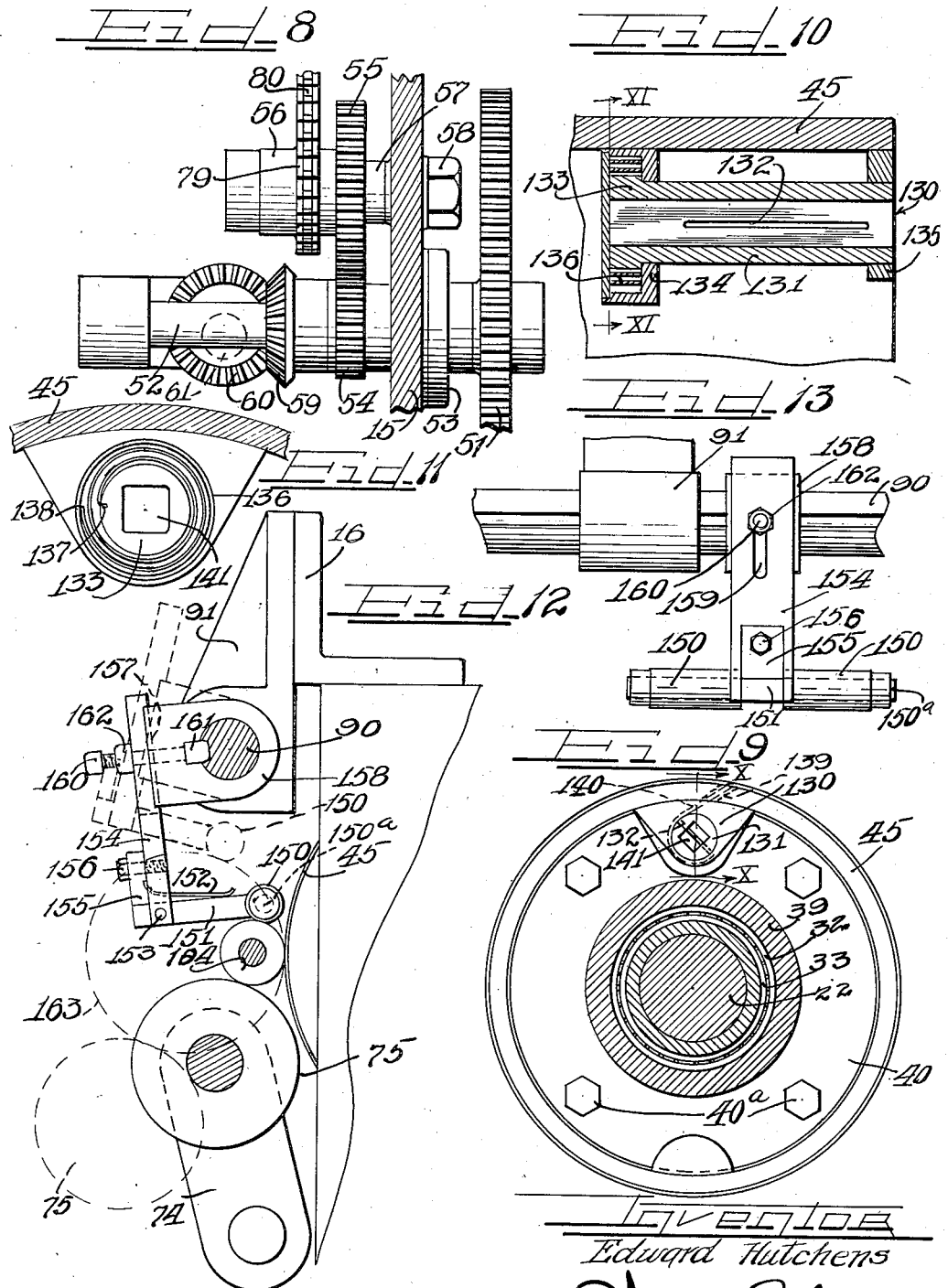

2,106,215

UNITED STATES PATENT OFFICE 2,106,215

ROLL GRINDING MACHINE

Edward Hutchens, Cudahy, Wis., assignor to Utility Manufacturing Company, Cudahy, Wis., a corporation of Wisconsin Application December 15, 1934, Serial No. 757,620

11 Claims. (Cl. 51—49)

This invention relates to a machine for grinding or abrading rollers, such as rubber print rollers, to provide the same with a smooth and even periphery. The invention includes a process for grinding the rollers whereby the formation of grooves and uneven hill and valley portions is avoided.

More specifically, this invention relates to a machine for grinding rubber print rolls to true and smooth their peripheries and form a smooth working surface thereon. The invention also includes a process for grinding rubber rollers on the machine of this invention.

It has heretofore been proposed to resurface printing rollers by grinding or abrading their working surfaces with an abrasive wheel that travels longitudinally along the roll similar to a cutting tool in a lathe. Machines of this character, however, only grind a surface of the roll of about one inch in width at one time and their travel back and forth over the entire length of the roller requires considerable time.

I have now provided a grinding or abrasive machine to resurface rubber rollers or composition rollers used on printing machines which acts upon the entire length of the roller at one time. The entire resurfacing operation may be completed by my machine within a few minutes. Furthermore, since my machine acts upon the entire length of the roller at one time, it is possible to obtain a truer surface on the roller than was heretofore obtainable.

It is therefore an object of this invention to provide a device for grinding rollers to provide a smooth and even periphery thereon in a short time.

A further object of this invention is to provide a grinding machine for printing rollers that acts upon the entire length of the roller at one time.

Another object of this invention is to provide a quick and economical method for surfacing rollers, such as rubber print rolls.

Another object of this invention is to provide an economical process for resurfacing rubber rollers at high speed.

A further object of this invention is to resurface the periphery of a worn print roll to provide a true and smooth working surface thereon.

A specific object of this invention is to provide a high speed machine for abrading the periphery of printing rollers to provide a true and smooth working surface thereon.

Other and further objects of this invention will be apparent from the following detailed description of the annexed sheets of the drawings which disclose a preferred modification of this invention.

On the drawings:

Figure 1 is a broken front elevational view of a machine according to this invention.

Figure 2 is a broken top plan view of a machine according to this invention.

Figure 3 is a broken cross-sectional view, with parts shown in elevation, taken substantially along the line III—III of Figure 1.

Figure 4 is a cross-sectional view taken substantially along the line IV—IV of Figure 2, with parts broken away.

Figure 5 is a broken cross-sectional view, with parts in elevation, taken substantially along the line V—V of Figure 3.

Figure 6 is a fragmentary side elevation of the right hand side of the machine as shown in Figure 1.

Figure 7 is a fragmentary side elevation of the left hand side of the machine as shown in Figure 1.

Figure 8 is a cross-sectional view, with parts in elevation, taken along the line VIII—VIII of Figure 4.

Figure 9 is a cross-sectional view, with parts in elevation, taken substantially along the line IX—IX of Figure 5.

Figure 10 is an enlarged cross-sectional view taken substantially along the line X—X of Figure 9.

Figure 11 is a cross-sectional view taken substantially along the line XI—XI of Figure 10.

Figure 12 is a vertical cross-sectional view with parts in elevation illustrating a holding down attachment and showing in dotted lines the change in the positions of the roll feeding and holding devices to accommodate rollers of various sized diameters.

Figure 13 is a fragmentary front elevational view of the holding down device shown in Figure 12.

Figure 14 is a fragmentary end elevational view of the grinding roller showing the clamping means for securing the abrasive sheet material which is wound around the roller.

As shown on the drawings:

In Figure 1, the reference numeral 10 indicates a supporting base upon which the machine is mounted. I-beam members 11 and 12, having flanged bases 13, are bolted to the base 10 by means of bolts 14 extending through their flanged bases. The I-beams 11 and 12 have a very wide web 15 extending across the full depth of the machine so as to form side walls for the machine.

An angle beam 16 is mounted on top of the I-beams 11 and 12 at the front end of the machine. The base 10, I-beams 11 and 12 and angle beam 16 form the framework for the machine.

A main driving motor 17 is mounted on the base 10 near one end thereof while an auxiliary motor 18 is mounted on the base near the other end thereof. The main driving motor 17 rotates a grooved pulley 19 for driving a plurality of V-shaped belts 20 which are disposed around the pulley 19 in the grooves therein. The belt 20 in turn drives a grooved pulley 21 which is rotatably mounted on a non-rotatable axle 22.

As shown in Figure 5, the axle 22 extends through bosses 23 and 24 bolted to the I-beams 11 and 12, respectively, in the web portion 15 thereof by means of bolts 25 and 26 (Figures 6 and 7). The central portion 27 of the axle 22 is provided with an enlarged diameter forming shoulders 28 and 29 at the ends thereof. An anti-friction bearing 30 is held against the shoulder 28 by means of a collar 31 which is threaded on the axle 22. Another anti-friction bearing 32 is held against the shoulder 29 by means of a sleeve 33 disposed around the axle 22. Anti-friction bearings 34 and 35 are disposed within the pulley 21 and serve to mount the pulley in freely rotatable relation relative to the axle 22. The bearings 34 and 35 are held against the sleeve 33 by means of a collar 36 threaded on the axle 22. The collar 36 also serves to urge the sleeve 33 against the bearing 32.

An end portion 21a of the pulley 21 is detachable from the remainder of the pulley to permit insertion of a grease packing ring 38 for retaining lubricant in the bearings. The end portion 21a of the pulley 21 is secured to the pulley by means of bolts or other securing means (not shown). The pulley 21 is also provided with a laterally extending tubular portion 39 terminating in an enlarged circular plate 40 which is bolted by means of bolts 40a (Fig. 9) to an annular supporting member 41 rotatable about the axle 22 on the bearing 32.

A boss 42 rotatably mounted around the axle 22 on the bearing 30 is provided with a lubricant retainer ring 43 and is secured to another annular supporting member 44. The supporting members 41 and 44 are disposed within a tube or roller 45 and are pressed into integral relation with the roller to drive the same. The roller 45 is provided around its outside periphery with a wrapping 46 of an abrasive material such as sand or emery paper. The pulley 21 drives the roller 45 so that it rotates relative to the axle 22. The axle 22, however, is prevented from rotating by means of a bolt 47 (Figure 1) extending through a transverse hole 48 (Figure 5) at one end of the axle.

As shown in Figures 1, 7 and 8, the auxiliary motor 18 is coupled by means of a coupling 49 to a shaft 49a rotatably mounted in the web 15 of the I-beam member 11. The end of the shaft 49a is keyed to a gear 50 which meshes with and drives a larger gear 51.

As shown in Figure 8, the gear 51 is secured on the end of a shaft 52 which extends through a bearing boss 53 and through the web 15 of the I-beam 11. A small gear 54 is keyed to the shaft 52 in spaced relation from the web 15. This gear 54 meshes with and drives another gear 55 keyed to a stub shaft 57. A boss 56 of a sprocket gear 79 is also keyed to the shaft 57. The gear 79 drives a chain 80 for a purpose to be hereinafter described. The stub shaft 57 is secured to the web 15 by means of a nut 58.

A beveled gear 59 is driven by the shaft 52 and meshes with another beveled gear 60 at right angles thereto. The gear 60 is provided with an off-center pivot opening 61. An eccentric pin 62 (Figure 1) extends into the opening 61 and is driven by the gear 60. The member 62 has an arm 63 which extends through the web 15 and is pivotally connected to a pair of vertically disposed bars 64 and 65 (Figure 7) by means of a bolt 66. The bars 64 and 65 are pivoted, by means of a bolt 68, around a lug 67 extending from the machine frame. It is evident that the eccentric throw of the gear 60 oscillates the link arm 63 to tilt the bars 64 and 65 about the axis 68. This movement causes a longitudinal movement of the axle 22 which is bolted to the ends of the bars 64 and 65 by means of the bolt 47.

The longitudinal movement of the axle 22 is transmitted to the sanding roller 45 through the bearings 30, 32, 34 and 35 which are locked against longitudinal movement relative to the axle. Stop members 69 and 70a are secured on the axle 22 to prevent an unseating of the axle from the bearing bosses 23 and 24 in the I-beam members 11 and 12, respectively.

From the above description, it is evident that the main driving motor 17 rotates the sanding roller 45 while the auxiliary motor 18 causes a tilting of the bars 64 and 65 to move the axle 22 longitudinally. This longitudinal movement of the axle is transmitted to the sanding roller 45 so that during the grinding operation, the drum is rotated and oscillated at the same time. The oscillations preferably are limited to longitudinal movement not exceeding one-half inch in length in each direction. The drum is rotated at a high speed of about 1,200 R. P. M. The oscillations during this time occur about twelve times per minute. It is obvious, however, that the amplitude of the oscillations and the speed of revolution may be varied throughout a wide range.

The flexibility of the V-shaped belts 20 permits the desired oscillation without interfering with the rotation of the sanding roller 45.

A shaft 70 extends across the front of the machine, as shown in Figure 1, and is mounted at the ends thereof in straps 71 and 72 secured to the front face of the I-beams 11 and 12, respectively. Arms 73 and 74 (Figure 1) are keyed to the shaft 70 and support a feeding roller 75 in rotatable relation by means of shafts 76 and 77 which extend laterally from the ends of the roller 75. The end of the shaft 76 is keyed to a sprocket gear 77 having a drive chain 78 meshed therearound.

In Figure 8, it has been described that the auxiliary motor 18 drives the gear 55 through a train of gears. A sprocket gear 79 mounted on the same shaft as the gear 55 is driven by the gear 55. As shown in Figure 4, the sprocket gear 79 drives a chain 80 which in turn drives another sprocket gear 81 freely rotatable about the shaft 70. The sprocket gear 81 is keyed to another sprocket gear 82 which latter gear drives the chain 78 to rotate the sprocket gear 77 and the feed roll 75.

As best shown in Figures 1, 6 and 7, a handwheel 83 is rotatably mounted in a housing 84 carried by the machine frame structure on a shaft 85. A worm gear 86 is formed on the shaft 85 within the housing 84 and meshes with a sector gear 87 which is keyed to the shaft 70. A rotation of the handwheel 83 produces a movement of the sector gear 87 which rotates the shaft 70 to raise or lower the supporting arms 73 and 74 and thereby move the feeding roll 75 either away from or toward the sanding roller 45.

The feeding roller 75 is driven in a direction opposite to that of the sanding roller 45, and as will be hereinafter described, the rubber roller to be resurfaced is placed in the nip between the feeding roll and sanding roll. The position of the feeding roll is adjustable to vary the nip or the distance between the feed roll and the sanding roll so that the machine is adapted to operate on rollers of any diameter. The feeding roll is driven by the auxiliary motor 18 while the sanding motor is driven by the main motor 17.

As best shown in Figures 1 and 2, a shaft 90 extends half way across the machine near the top thereof. The shaft 90 is mounted at the ends in bosses 91 and 92 which are secured to the top angle bar 16. An arm 93 is keyed to the shaft 90 and extends downwardly therefrom for a purpose to be hereinafter described. The end of the shaft 90 is keyed to a bar member 94 which extends laterally from the side of the machine. A second bar member 95 is placed in juxtaposed relation with the member 94 and abuts the same on one flat side thereof. A second shaft 96 is keyed in the member 95 and extends slightly into the member 94 as shown in dotted lines in Figure 2. The other end of the shaft 96 is mounted in a boss 97 secured on the top angle bar 16 of the machine frame structure. An arm 98 is keyed to the shaft 96 intermediate the ends thereof, the arm 98 being identical with the arm 93 which is keyed on the shaft 90.

As best shown in Figure 7, a pin 99 extends through the bars 94 and 95. However, the bar 95 is provided with an aperture 100 having a diameter larger than the diameter of the pin 99. Adjusting screws 101 and 102 are threaded through the top and botton, respectively, of the bar 95 for engaging the pin 99. An adjustment of these screws, therefore, effects a vertical movement of the pin 99 in the aperture 100 and causes a slight relative movement between the bars 94 and 95, thereby moving the arms 93 and 98 which are keyed on the shafts 90 and 96, respectively, to adjust the arms into perfect alignment. As shown in Figures 6 and 7, the arms 93 and 98 are extensible by allowing the shaft shown in dotted lines to move downwardly in their housings. These shafts, of course, are secured into the housings during operation of the machine.

The shafts 90 and 96 are grooved across their front face, as at 90a and 96a, respectively. These grooves serve as anchoring means for the keys (not shown) used to lock the arms 93 and 98 on the shafts. Since the grooves extend longitudinally on the shafts, the arms 93 and 98 can be moved to engage the ends of a rubber roller of any length.

As best shown in Figures 6 and 7, the ends of the arms 93 and 98 are bifurcated for receiving the axle 103 of the rubber roller 104 that is to be resurfaced.

As best shown in Figures 1 and 6, a member 105 having a horizontal arm 106 extending below the angle beam 16 and a downwardly sloping arm 107 extending outwardly from the front of the machine is rotatably disposed around the end of the shaft 90. An adjusting screw 108 is threaded through the angle beam 16 for acting as a stop for the arm 106 for a purpose to be hereinafter described.

A second member 109 is keyed to the shaft 90 between the boss 91 and the member 105. The member 109 extends beyond the sloping arm 107 of the member 105, as shown in Figure 6. As best shown in Figure 1, the member 109 is forked at the ends thereof, and a pin 110 (Figure 6) extends between the forked ends of the member 109 and is rotatably mounted in the forked ends.

A threaded adjusting bar 111 extends through the pin 110 and is adjusted axially relative to said pin by means of adjusting nuts 112 and 113 which are threaded on the bar 111 and abut the collars 110a placed around the bar 111 on each side of the pin 110.

A member 114 is keyed on the right end of the shaft 70, as shown in Figures 1 and 6. The member 114 is provided with forked ends (not shown) similar to the ends of the member 109, and a pin 119, similar to the pin 110, is pivotally mounted between the forked ends of the member 114. A coiled spring 115 is disposed around the bar 111 and held under compression between a collar 116 formed on the bar and the pin 119. A second coiled spring 117 is likewise disposed around the rod 111 and held under compression between the nut 118 and the other side of the pin 119.

The arm 107 of the member 105 is slotted, as shown at 120 (Figure 6) and a bolt 121 extends through this slot and through the member 109. The nuts 112 and 113 are adjusted along the rod 111 to provide the desired compression of the springs 115 and 117. The bolt 108 extending through the angle beam 16 is threaded down a desired distance to act as a stop member to limit the travel of the roller 104 against the sanding roller 45. As pointed out above, the member 105 is freely rotatable around the shaft 90 and can be adjusted by means of the bolt 121 in the slot 120 in relation to the member 109 which is keyed on the shaft 90 so that the elongated arm 106 will be spaced a desired distance from the stop bolt 108. When the bolt 121 is tightened to secure the member 105 to the member 109, the spring pressure of the springs 115 and 117 will act against the roller 104 only as long as the arm 106 is spaced from the adjusting bolt 108. When this arm contacts the end of the bolt, the roller 104 cannot be further urged against the sanding roller 45. This mechanism provides for a preadjusting of the desired amount of material to be taken off the rubber roller during the grinding operation.

During the grinding operation, it is desirable to maintain the rubber roller being ground rotating on an axis lying in the same horizontal plane with the axis of the sanding roller. This adjustment is made to accommodate rubber rolls of all sizes by a manipulation of the handwheel 83 which raises and lowers the feeding roller 75 and also rotates the member 114 which acts against the springs 115 and 117 to move the rod 111 and thus rotate the member 109 and the shafts 90 and 96. This movement of the shafts, of course, causes a movement of the roll supporting arms 93 and 98 so as to maintain the ends of the same just above the axis of the sanding roller 45 and thereby hold the rubber roll to be ground in the desired position.

As pointed out above, the sanding roller 45 has wound therearound an abrasive sheet 46, such as sandpaper or emery cloth. This sheet 46, as shown in Figures 1 and 3, is preferably wound diagonally around the periphery of the roller 45, beginning with the end 170 (Figure 14) which is threaded through a slot 171 in the roller 45 at one end thereof and clamped between a bar 172 and the inside of the roller 45 by a bolt 173. With the end of the strip so fixed, the remainder of the strip is readily wound beginning from the left end of the roller diagonally toward the right end with the windings adjoining each other to provide a smooth surface over the entire periphery of the roller.

According to this invention, a tensioning device 130 is mounted in the roller 45 at the right end thereof, as shown in Figure 5. This tensioning device 130, as shown in Figures 9, 10 and 11, comprises a cylindrical sleeve 131 extending in spaced relation from the periphery of the roller 45 at the inside thereof and away from the end of the roller for a short distance. The sleeve 131 is slotted, as shown at 132, and is provided with an enlarged end 133 encased in a housing 134 which is mounted on the inside periphery of the roller 45. The other end of the sleeve 131 is mounted in a block 135 secured to the inside periphery of the roller 45 at the end of the roller. The sleeve 131 is rotatable in the housing 134 and block 135. The enlarged portion 133 of the sleeve 131 is secured to the end of a spiralled spring 136 which is encased in the housing, as shown at 137. The other end of the spring 136 is secured to the housing 134, as shown at 138 (Figure 11).

As shown in Figure 9, a slot 139 is provided in the roller 45 above the tensioning device 130. The other end 140 of abrasive strip 46 that is wound around the periphery of the roller 45 is threaded through this slot 139 around the sleeve 131 and through the slot 132 in the sleeve.

The sleeve 131 (Figures 9 and 11) has a square opening 141 extending therethrough. (A square-nosed wrench (not shown) may be inserted in the end of the sleeve to engage the square opening 141, and the tension device thereby readily rotated to tighten the spring 136.) The end 140 of the abrasive winding 46 is next threaded, as shown in Figure 9, through the slot 132, and the strip 46 is held tightly around the roller 45 and sleeve 131 by the spring 136.

I have also provided an attachment for the machine to hold the rubber roller in proper position in the nip between the feed roller 75 and the sanding roller 45. In the grinding of small diameter rolls, especially rolls which are light in weight, there is a tendency for the rolls to jump during the grinding operation. In order to overcome this jumping motion, I have provided a holding device, as shown in Figures 12 and 13, which can be supported from the shafts 99 and 96 which also support the arms 93 and 98 engaging the ends of the roller being ground. This holding device is useful when the roller being ground is extremely long and cannot be firmly held against the sanding roller by merely supporting the axle of the roll at the ends thereof by means of the arms 93 and 98. This device may also be used in place of the arms 93 and 98.

As shown in Figures 12 and 13, a pair of small diameter rollers 150 are rotatably mounted on an axle 150a. The axle 150a is supported by an arm 151 which is pivotally mounted at 153 in a supporting member 154. A plate 155 is bolted to the supporting member 154 at 156 and serves to engage the end of the arm 151 to prevent the same from moving upward beyond the elastic limits of a spring 152 which urges the arm 151 downwardly. The spring 152 is at all times maintained in contact with the arm 151 and is compressed by adjusting the supporting member 154 vertically in the groove 157 of a carrying member 158 which is disposed around the shaft 90. As shown in Figure 13, the supporting member 154 is slotted at 159 and a bolt 160 extends through the slot and is threaded into the member 158. The member 158 is keyed by a key 161 to the shaft 90. The key 161 is held in a slot in the shaft 90 by the bolt 160. A collar 162 is threaded on the bolt 160 and serves to clamp the member 154 in proper adjusted position on the member 158. It should be understood that a duplicate set of the holding rollers 150 are provided near the other end of the machine and are supported from the shaft 96 of the machine in the same manner as the above described rollers are supported from the shaft 90.

As shown in Figure 12, when a roll 163 having a large diameter is being ground, the holding rollers 150 are raised by loosening the collar 162 and raising the member 154 in the slot 159. The handwheel is rotated to lower the feeding roller 75. This movement also causes an outward movement of the supporting arms 93 and 98 and the holding down mechanism described above. In the grinding operation, it is desirable, as pointed out above, to maintain the roller being ground rotating about an axis lying in the same horizontal plane with the axis of the grinding roller. Therefore, the feeding roller is adjustable vertically so that it can be raised and lowered to rotate the peripheries of various sized rolls so that their axes will be in the desired planes. Because a large sized roll requires a lowering of the feeding roller, the adjusting mechanism is so arranged that the holding down mechanism and supporting mechanism will be moved outwardly during the same operation to engage the rubber roller. It follows that the axles of large diameter rolls will be maintained in a different position from the position maintained by the axles of the small diameter rolls. Therefore, a movement of the feed roller to adjust the machine for large sized rolls also causes the proper movement of the supporting arms and holding down mechanism. Each of these supporting arms and holding down mechanism are further adjusted by means of the additional devices described above to compensate for any unequalities in the roll that is to be ground.

As best shown in Figures 2, 3 and 4, a bin 170 encases the top half of the periphery of the sanding roller 45. This bin 170 is adapted to collect the particles abraded from the roller being ground, and comprises a flat top 171, a vertical back 172 disposed across the back end of the machine and having an opening 173 at the bottom thereof covered with a plate 174. The bottom of the bin 170 slopes upwardly from the back of the machine, as shown at 175 (Figure 4), and terminates in spaced relation from the periphery of the sanding roller 45. The top 171 of the bin 170 has a sloping portion 176 which extends toward the front of the machine just above the sanding roller. A blower 177, driven by a motor 178, creates a downward draught of air toward the bottom of the bin which sucks air and abraded particles surrounding the periphery of the sanding wheel into the bin. The draught of air created by the blower 177 is not strong enough to blow the abraded particles upward and the bin 170 therefore acts as a cyclone separator permitting the abraded particles to collect at the bottom of the bin where they may be removed through the opening 173. The air is recirculated to the blower through a duct 179.

From the above description it is evident that I have provided a machine adapted to resurface rollers, such as rubber rollers of any diameter or length by feeding the periphery of the roller against a sanding roller which acts on the entire length of the roller to be ground at one time. Supporting devices and holding down devices for the roller being ground are provided to operate in conjunction with the feeding roller for adjusting the machine to fit rollers of different diameters or lengths. The sanding roller is vibrated axially during its rotation to prevent the formation of grooves or hill and valley portions on the roller being ground, due to unevenness in the abrading material.

The abraded particles are collected in a cyclone separator and may be used for the molding of new rubber rollers. The adjusting features of my machine make possible a micrometer adjustment so that the roll being resurfaced can be provided with a very true, accurate and smooth working surface. The machine is operated at high speed and rollers up to 72 inches in length may be ground in about four to ten minutes, whereas heretofore several hours have been required for a resurfacing operation on a large sized roll.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. A grinding machine comprising a frame structure, an elongated abrasive roller rotatably mounted in said frame structure, a motor for rotating said roller, a shaft mounted on the front of said frame structure and extending across the front of the machine below the abrasive roller, arms secured to said shaft near the ends thereof, a feeding roller rotatably mounted at the ends thereof in said arms, a chain drive encased in one of said arms for rotating the feed roller, a motor for actuating said chain drive, and manual means for rotating said shaft to move the arms thereon and raise and lower the feeding roller relative to the abrasive roller.

2. In a grinding machine, a frame structure, a grinding roller rotatably mounted in said frame structure, a shaft extending about halfway across the front of said frame structure and mounted in straps carried by the frame, a second shaft similarly disposed across the other half of the frame structure in alignment with the first mentioned shaft, arms carried by said shafts slidable along the shafts, means for locking said arms in adjusted position on the shafts, a pair of juxtaposed bars each secured to the end of a shaft and extending outwardly therefrom, an enlarged aperture in one of said bars, a pin secured in the other of said bars and extending into the enlarged aperture of the other bar in spaced relation from the walls defining the aperture, set screws threaded through the apertured bar to engage the pin whereby one of said shafts can be slightly rotated relative to the other shaft for perfectly aligning the arms carried by each shaft.

3. In a grinding machine, a frame, a grinding roller, a pair of aligned slotted shafts each extending halfway across the front of the frame, straps carried by the frame for mounting said shafts on the frame, an arm keyed in the slot of each shaft and adapted to be slid longitudinally along the shafts, means securing the adjoining ends of said shafts together, an adjusting device cooperating with said means to slightly rotate one shaft relative to the other for aligning the said arms, and spring means for rotating said shafts as a unit.

4. A roll grinding machine comprising a frame structure, a grinding roller rotatably mounted therein, a feed roller rotatably mounted in front of said grinding roller, holding means for mounting a roll to be ground in the nip between the grinding roller and feed roller, spring means acting on said holding means, means for raising and lowering said feed roller relative to said grinding roller, said means also moving said holding means into proper position above the nip between the feed and grinding rollers.

5. A grinding machine for surfacing rollers comprising an elongated grinding roller having a peripheral abrasive surface at least as long as the roller to be ground, a feed roller in spaced relation in front of said grinding roller for supporting the roller to be ground in the nip between the feeding and grinding rollers, supports for holding the roller to be ground in said nip, a spring device urging said supports against the roller being ground, and a stop member for said spring device preventing the device from acting on the supports when the roll being ground has been abraded to a predetermined degree.

6. A grinding machine for surfacing rubber rollers and the like comprising a base, a frame structure secured to said base, a main driving motor on said base, an auxiliary motor on said base, a grinding roller rotatably mounted in said frame structure on a non-rotatable axle, means driven by the auxiliary motor for oscillating said axle, means transmitting the oscillations of the axle to the roller, a grooved pulley secured to said roller, belts connecting said pulley with said main motor to drive the roller, a feed roller rotatably mounted in front of said grinding roller, means for raising and lowering said feed roller and a chain drive actuated by said auxiliary motor to rotate the feed roll.

7. A grinding machine for surfacing rubber rollers and the like comprising a grinding roller, a feed roller disposed in front of said grinding roller, means for holding the ends of a rubber roller to be ground in the nip between said rollers, an adjustable stop device to limit the extent of movement of the rubber roller against the grinding roller and a detachable holding down device for acting against the intermediate portion of the rubber roller to prevent the roller from jumping during the grinding operation.

8. In a grinding machine for surfacing rubber rollers and the like, a grinding roller having a peripheral abrasive surface adapted to receive thereagainst the entire length of a roller to be ground, a feed roller in front of said grinding roller for supporting a roll to be ground in the nip between the feed roller and grinding roller, means for driving said feed roller to rotate the roll to be ground against the abrasive surface of the grinding roller, a shaft below said feed roller, arms extending from the shaft to engage the ends of the feed roller for rotatably supporting the roller, and means for rotating said shaft to raise and lower the feed roller relative to the grinding roller and thereby adjust the level of the roll being ground against the grinding roller.

9. A grinding machine comprising a frame, a grinding roller rotatably mounted therein, a shaft extending across the front of the frame near the top thereof, arms adapted to be slid along said shaft keyed against rotation on the shaft, extensible means on said arms adapted to engage the axles on the ends of a rubber roller to be ground, a forked bracket keyed to one end of said shaft, a rod pivoted in said bracket, a second shaft extending across the front of said frame, arms keyed to said second shaft, a feed roller rotatably mounted at the ends thereof in said arms, a forked bracket keyed to the end of said second shaft for receiving the rod therethrough in pivotal relation, coiled springs disposed around said rod urged against the bracket, means for adjusting the compression of said springs, nuts threaded on the upper portion of said rod to adjust the rod longitudinally in the brackets for urging the arms keyed on the first mentioned shaft, and means for rotating said second shaft whereby said feed roller is raised or lowered and said rod is actuated to move the arms keyed on the first mentioned shaft into proper position above the feed roller.

10. In a grinding machine for surfacing rubber rolls and the like, a frame, shaft means extending across the front of said frame near the top thereof, brackets keyed to said shaft, tracks formed in the front face of said brackets, bars mounted in said tracks, means for locking said bars in adjusted position on said brackets, arms pivoted to the ends of said bars, rollers rotatably mounted on the ends of said arms, and spring means urging said arms downwardly so that the rollers thereon are urged against the periphery of a rubber roller to be ground to hold the roller in proper position in the machine.

11. A machine for surfacing rollers comprising an elongated grinding roll adapted to receive thereagainst the entire length of a roll to be ground, a feed roll in spaced parallel relation to the abrasive roll, supporting arms for the ends of said feed roll, a shaft keyed to the ends of said arms, means for rotating the feed roll relative to the supporting arms, means for rotating the supporting arms about the shaft for raising and lowering the feed roll, and separate spring urged means for holding the roll to be ground in the nip between the feed roll and the abrasive roll.

EDWARD HUTCHENS.